United States Patent [19]

Oishi et al.

[11] Patent Number: 4,607,299
[45] Date of Patent: Aug. 19, 1986

[54] MAGNETIC TAPE CASSETTE INCLUDING ERASURE PREVENTION MEANS, AND CASSETTE OPERATING DEVICE FOR SAME

[75] Inventors: Kengo Oishi; Osamu Suzuki, both of Kanagawa, Japan

[73] Assignee: Fuji Photo Film Co., Ltd., Kanagawa, Japan

[21] Appl. No.: 553,918

[22] Filed: Nov. 21, 1983

[30] Foreign Application Priority Data

Nov. 22, 1982 [JP] Japan .............................. 57-203736

[51] Int. Cl.⁴ .................... G11B 15/04; G11B 19/04; G11B 23/02
[52] U.S. Cl. .................................... 360/60; 360/96.5; 360/132
[58] Field of Search .............. 360/60, 132, 96.1, 96.5; 242/197, 198, 199

[56] References Cited

U.S. PATENT DOCUMENTS

| | | | |
|---|---|---|---|
| 3,950,786 | 4/1976 | Shapley | 360/60 X |
| 3,957,225 | 5/1976 | Vogel | 360/96.5 X |
| 4,012,011 | 10/1975 | Saito | 360/60 X |
| 4,041,537 | 8/1977 | Kishi | 360/60 |

FOREIGN PATENT DOCUMENTS 0091171 10/1983 Netherlands ......................... 360/60

Primary Examiner—Raymond F. Cardillo
Assistant Examiner—Alyssa H. Bowler
Attorney, Agent, or Firm—Sughrue, Mion, Zinn, Macpeak & Seas

[57] ABSTRACT

A magnetic tape cassette system includes an erroneous erasing preventing member which is controlled by an operating device on a cassette deck to prevent erroneous erasing of a tape cassette. The erroneous erasing preventing member includes a space with an opening provided on a peripheral wall of a tape cassette, and an opening and closing member which in a first position prevents erasing of the tape cassette and in a second position closes the opening to the space, thereby allowing the tape cassette to be erased.

5 Claims, 5 Drawing Figures

MAGNETIC TAPE CASSETTE INCLUDING ERASURE PREVENTION MEANS, AND CASSETTE OPERATING DEVICE FOR SAME

FIELD OF THE INVENTION

This invention relates to an erroneous erasure preventing member operated by a device within a magnetic tape cassette to prevent signals recorded on the magnetic tape from being erased by mistake.

BACKGROUND OF THE INVENTION

A conventional audio or video tape cassette has an erroneous erasure preventing means on its peripheral wall, which prevents signals recorded on the magnetic tape from being carelessly erased. The means comprises: a recess formed in the peripheral wall of the cassette; and a tongue-shaped member which is formed in the recess in such a manner as to close the recess. Heretofore, in order to prevent signals recorded on the magnetic tape from being carelessly erased with the tape deck or the like, the tongue-shaped member was removed from the recess. When a cassette from which the tongue-shaped member has been removed is loaded in the tape deck, a detecting member of the tape deck goes into the recess, which has been opened by removing the tongue-shaped member, as a result of which an operating button such as an image recording button or a sound recording button is locked so that signals may not be recorded on the magnetic tape.

In such a system, in order to prevent signals recorded on the magnetic tape from being erased by mistake, it is necessary to remove the tongue-shaped member. When it is subsequently desired to record signals on the magnetic tape of the cassette from which the tongue-shaped member has been removed, it is necessary to close the recess with a piece of adhesive tape. These operations are considerably troublesome for the operator.

SUMMARY OF THE INVENTION

In view of the foregoing, an object of this invention is to provide a magnetic tape cassette having an erroneous erasure preventing member with which the recording of signals on the magnetic tape by mistake or the erroneous erasure of signals from the magnetic tape can be readily and positively prevented. A device is provided for operating the erroneous erasure preventing member in association with the operation of the tape deck.

According to the invention, a magnetic tape cassette is provided with an erroneous erasure preventing member for preventing signals recorded on the magnetic tape from being erased by mistake. The erroneous erasure preventing member is provided in the peripheral wall of the cassette and comprises: a space which has an opening in the peripheral wall of the cassette; and an opening and closing member fitted in the space, the opening being opened and closed as the opening and closing member moves according to the space.

Also provided in the invention is a magnetic tape cassette operating device which comprises: a substantially F-shaped release lever which has an engagement portion for engaging an opening and closing member adapted to prevent signals recorded on the magnetic tape from being erased by mistake; and a roller adapted to abut against the peripheral wall of the cassette. The release lever is supported by a pin which is loosely fitted in a hole cut in the release lever. When an operating button on a tape deck is depressed, the engagement portion is pushed to engage the opening and closing member, and the opening and closing member is opened when the magnetic tape cassette is ejected.

The foregoing object of the invention has been achieved by the provision of the magnetic tape cassette having the aforementioned erroneous erasure preventing member, and the magnetic tape cassette operating device.

DETAILED DESCRIPTION OF THE INVENTION

One embodiment of the invention, the technical concept of which is applied to a video tape cassette and a video tape recorder, will be described with reference to the accompanying drawings.

Figure 1:
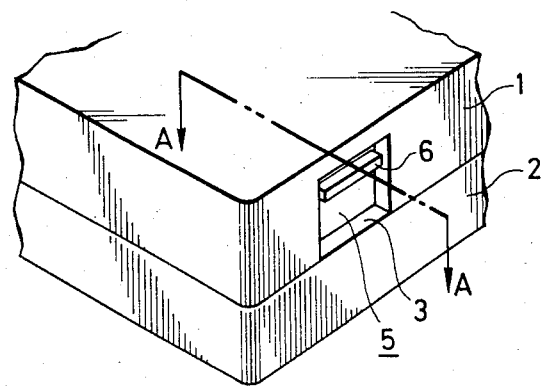
FIG. 1 is a perspective view showing one example of an erroneous erasure preventing member according to this invention.
Figure 2:
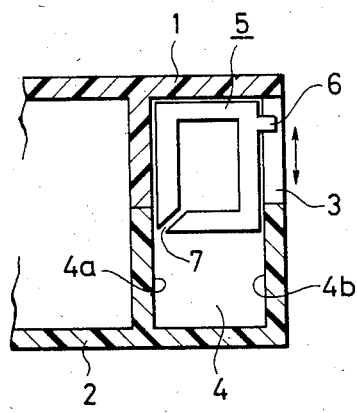
FIG. 2 is a sectional view taken along line A—A in FIG. 1.
Figure 3:
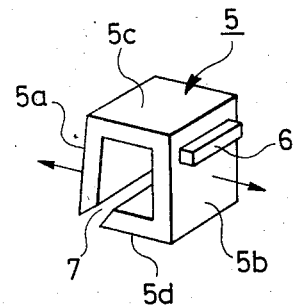
FIG. 3 is a perspective view of the opening and closing member of FIGS. 1 or 2, and FIGS. 4 and 5 are explanatory diagrams outlining the magnetic tape cassette operating device which is used in conjunction with the erroneous erasure preventing member.

In FIGS. 1-3, reference numeral 1 designates the upper cassette half (hereinafter referred to as "the upper half 1" when applicable); and reference numeral 2 designates the lower cassette half (hereinafter referred to as "the lower half 2", when applicable). The cassette has an opening 3 cut in its peripheral wall, and a space 4 which communicates with the opening 3, as shown in FIG. 2. An opening and closing member 5 is fitted in the space 4 in a manner such that it is movable vertically in FIG. 2, with its sliding surfaces 5a and 5b abutted, respectively, against inner walls 4a and 4b of the space 4. The opening and closing member 5 has the aforementioned sliding surfaces 5a and 5b, and upper and lower surfaces 5c and 5d, as shown in FIG. 3. The sliding surface 5a and the lower surface 5d are not joined together, thus forming a slit 7. The member 5 is made of elastic material such as polyurethane, ABS or polyacetal resin. The member 5 is so designed that the sliding surfaces 5a and 5b are biased outwardly (as indicated by the arrows in FIG. 3) and, when the member 5 is in the space 4, the sliding surfaces 5a and 5b are suitably pushed against the inner walls 4a and 4b. A knob 6 is formed integrally on the sliding surface 5b in such a manner as to protrude in the opening 3.

Figure 4:
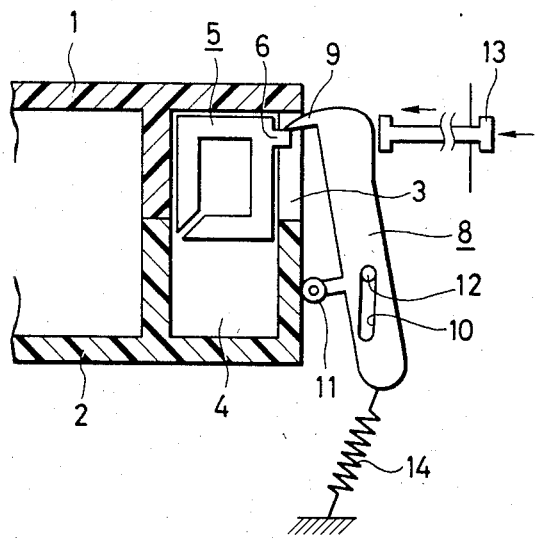
Figure 5:
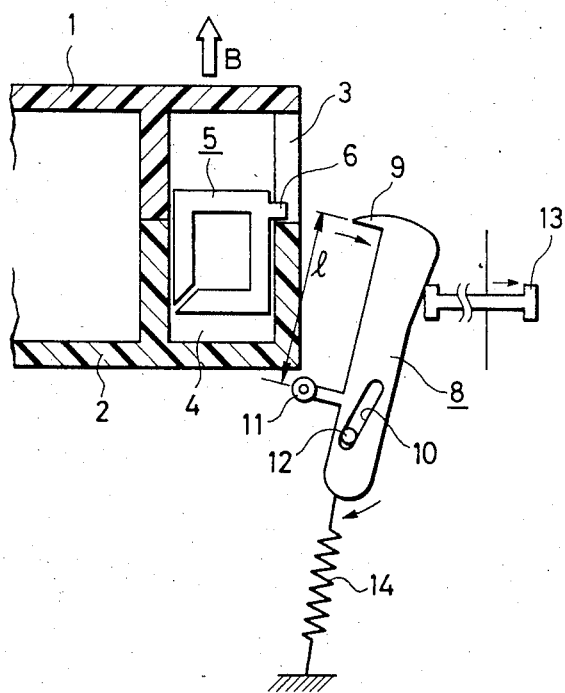

The erroneous erasure preventing member of the video tape cassette is constructed as described above. Therefore, a recording can be prevented from being mistakenly erased merely by pushing down the knob 6 of the opening and closing member 5. Although the method is simple, it can positively protect the record from being erroneously erased. Erasure prevention is accomplished in the conventional manner, i.e., erasure and/or recording will be inhibited if the detection probe on the cassette machine is allowed to project into the aperture when the closing member 5 is in its lower position as shown in FIG. 5, while erasure and/or recording will be permitted if the detection probe is not permitted to project into the aperture due to contacting the closing member 5 in its upper position as shown in FIG. 4. When it is necessary to record new data on the tape the cassette can be made to be ready for recording merely by pushing up the knob 6 to close the opening 3.

A magnetic tape cassette operating device which operates the erroneous erasure preventing member in a video tape recorder will be described with reference to FIGS. 4 and 5.

FIG. 4 is an explanatory diagram showing a release lever 8 of the device, which is engaged with the opening and closing member 5. FIG. 5 is an explanatory diagram showing the member 5 in its set state.

The release lever 8 has an engaging pawl 9 at its upper end, and is urged downwardly by spring 14 coupled to its lower end. The release lever 8 is supported by a supporting member 12 loosely fitted in an elongated hole 10 cut therein and has a roller 11 abutted against the peripheral wall of the cassette.

In ejecting a recorded video tape cassette from the video tape recorder, a set button 13 is pushed before the cassette ejecting operation. In this operation, the upper end of the release lever 8 is pushed by the set button 13, and therefore the engaging pawl 9 of the release lever 8 is engaged with the knob 6 of the opening and closing member 5. The set button 13 is maintained against the release lever 8. Under this condition, the cassette is moved in the direction of the arrow B in FIG. 5 by the cassette ejecting operation. As a result, the opening and closing member 5 is slid downwardly in the space 4 by the release lever 8, i.e., the cassette is set so that the recorded signals cannot be erased by mistake.

When the cassette is initially moved in the direction of the arrow B, the release lever 8 is moved in the same direction as the cassette. However, when the supporting member 12 strikes the lower end of the elongated hole 10, the engaging pawl 9 starts moving the member 5 downwardly. In association with this operation, the abutment position of the roller 11 is moved downwardly. When the member 5 has been moved to its lowest position, the roller 11 leaves the wall of the cassette; i.e., it is released from abutment. At the same time, the engaging pawl 9 is disengaged from the knob 6, so that the engaging pawl 9 is moved to reset the set button 13.

In order to smoothly operate the release lever 8, the distance l between the engaging pawl 9 and the roller 11 should be so determined that when the opening and closing member 5 has been set (moved to the lowest position) the roller 11 is disengaged from the wall of the cassette and the release lever 8 is urged obliquely by the spring 14 as illustrated. Thus, in unloading the cassette, the member 5 is set smoothly.

The provision of the erroneous erasure preventing member and the magnetic tape cassette operating device, which are constructed as described above, eliminate the drawbacks accompanying the conventional cassette wherein the tongue-shaped member must be manually removed, and the troublesome operation in which the opening and closing member 5 must be manually moved. Furthermore, in the present invention when a tape cassette is ejected from the video tape recorder, the opening and closing member 5 is automatically set so that the recording is not erased by mistake.

We claim:

1. A magnetic tape cassette system including a cassette and a cassette machine, in which signals recorded on a magnetic tape cassette are prevented from being erased by mistake, said cassette system comprising:

a space internal of said cassette and having an opening provided in a peripheral wall of said cassette, and an opening and closing member fitted into said space, wherein said opening is opened when said opening and closing member is in a first position and erasing of said cassette is prevented when said opening and closing member is in said first position, and said opening is closed when said opening and closing member is in a second position and erasing of said cassette is allowed when said opening and closing member is in said second position; and a magnetic tape cassette operating device which is operable upon ejection of said cassette from said machine for engaging said opening and closing member to move said member from said second position to said first position.

2. A magnetic tape cassette system, as claimed in claim 1, wherein said opening and closing member is made of polyacetal resin.

3. A magnetic tape cassette system, as claimed in claim 1, wherein said operating device comprises:

a substantially F-shaped release lever having a hole cut in one end, and having an engaging part which engages said member at the other end, said release lever being supported by a pin attached to said magnetic tape cassette system which is loosely fitted in said hole cut in said release lever; and a roller adapted to abut against the peripheral wall of said cassette while said cassette is being ejected and adapted to leave said peripheral wall when said member moves to said first position, wherein said release lever disengages from said member when said roller leaves said peripheral wall.

4. A magnetic tape cassette system, as claimed in claim 1, wherein said opening and closing member is made of polyurethane.

5. A magnetic tape cassette system, as claimed in claim 1, wherein said opening and closing member is made of ABS.

* * * * *